UNITED STATES PATENT OFFICE.

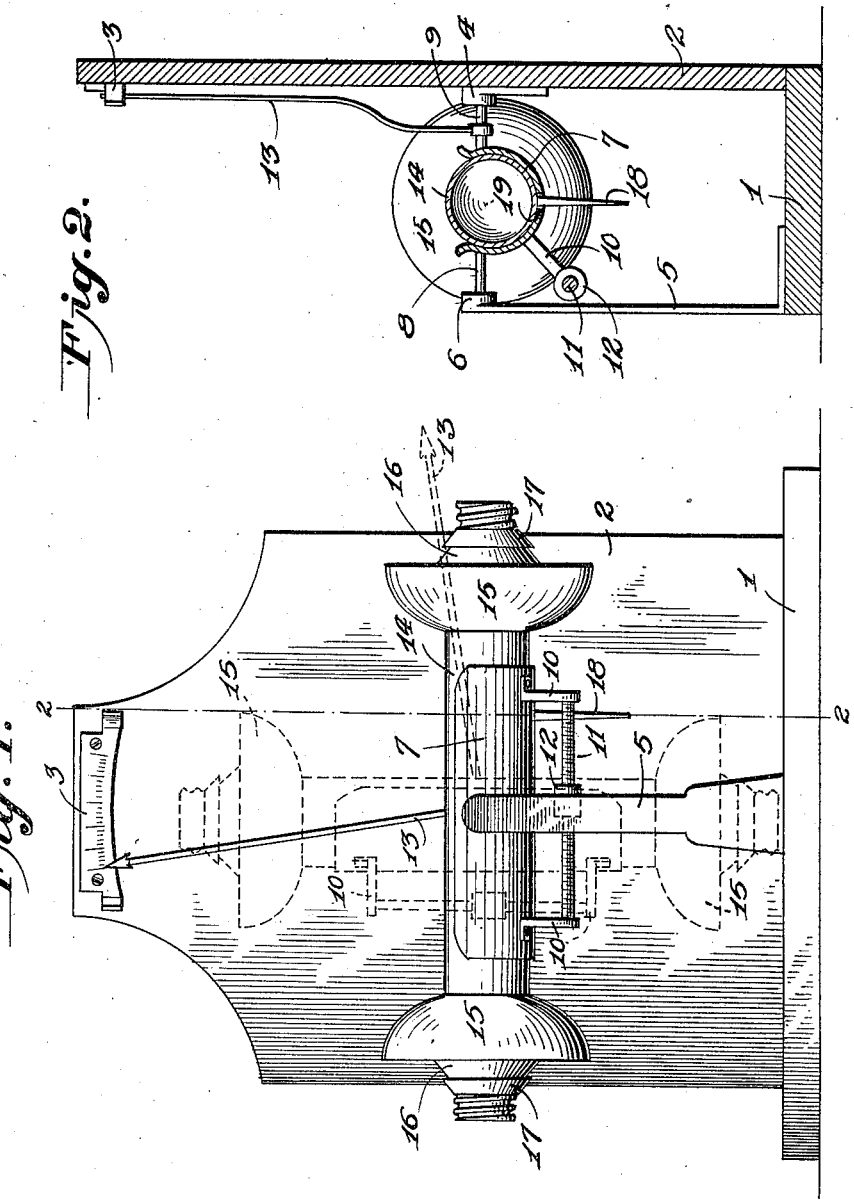

SILAS WITHERELL, OF OTTUMWA, IOWA.

MILK AND CREAM TESTING DEVICE.

1,002,106.  Specification of Letters Patent.  Patented Aug. 29, 1911.

Application filed March 19, 1910. Serial No. 550,379.

*To all whom it may concern:*

Be it known that I, SILAS WITHERELL, a citizen of the United States of America, residing at Ottumwa, in the county of Wapello and State of Iowa, have invented certain new and useful Improvements in Milk and Cream Testing Devices, of which the following is a specification, reference being had therein to the accompanying drawing.

This invention relates to the subject of testing milk, and the principal object of the same is to provide means whereby the weight of a given amount of milk may be readily and accurately ascertained, after which the weight of the cream or butter-fat of the milk is ascertained thereby providing means whereby the proportion of cream or butter-fat to a given amount of milk may be readily and accurately ascertained.

In producing an apparatus for carrying out the process of testing milk to ascertain the weight of its cream or butter-fat, it will be understood, of course, that the same is necessarily susceptible of a wide range as to details and structural arrangements, one simple and practical embodiment of which is shown in the accompanying drawing in which:—

Figure 1 is a view in front elevation of a milk tester constructed in accordance with this invention. Fig. 2 is a central vertical sectional view taken on the line 2—2, Fig. 1.

In the accompanying drawing the testing apparatus shown for ascertaining the weight of the cream, or butter-fat, of a given amount of milk, comprises a flat base 1 from one side of which a vertically arranged back board 2 projects, the upper central portion of the board being provided with a strip 3 upon which graduations are marked to indicate weight in pounds, ounces, and fractions thereon. Said board is also provided with a bearing 4 that is centrally located thereon below said graduated strip 3. A vertical standard 5 projects from the opposite side of base 1 and has its upper end equipped with a bearing 6 which is in the same plane, and directly opposite bearing 4. A trough-shaped pan 7 provided with open ends has centrally located outwardly projecting lateral stub shafts 8—9 extending from its sides, shaft 8 having its outer end journaled in bearing 6 and shaft 9 having its outer end journaled in bearing 4. Pendent hanger lugs 10 project from the bottom surface of the pan 7 at each end, said lugs supporting a threaded shaft 11 below and parallel with said pan. A weight 12 is mounted on shaft 11 and adapted to be adjusted longitudinally thereof. A pointer 13 extends from shaft 9 and coöperates with the strip 3 to indicate the weight of an article resting in the pan 7.

The milk receptacle comprises a cylindrical body 14 that is of the same contour of the pan 7, said body having an enlarged chamber 15 at each end. A neck 16 is provided for each chamber, and a cap 17 is provided for sealing said necks. Body 14 is provided with a laterally projecting lug 18 that is adapted to be passed through an opening 19 of pan 7 to prevent slippage of said body relative to the pan.

In carrying out the process of ascertaining the weight of milk by the apparatus described in the foregoing, the receptacle is filled with milk and then seated in the pan 7, as shown by full lines in Fig. 1, and the weight of the same ascertained. The balance weight 12 is then adjusted on shaft 11 so that pointer 13 will be opposite zero on the scale 3. The pan with the receptacle thereon, is then turned to the vertical position indicated by dotted lines in Fig. 1 and retained in such position until the cream or butter-fat has separated from the milk, the butter-fat obviously takes the upper end of the receptacle and the milk the lower end. The pan and receptacle are then returned to their original position, whereupon the milk end of the receptacle being heavier than the other end will rock pan 7 to a tilted position and cause pointer 13 to readily indicate on scale strip 3 the weight of said heavier end.

It will be seen from the foregoing that the described manner of testing milk is simple, yet absolutely accurate.

What I claim as my invention is:—

1. The method of testing milk which consists in confining the milk in a receptacle, whereby a separation of the milk and the butter-fat is effected, so that the milk may occupy one end of the receptacle and the butter-fat may occupy the opposite end, and ascertaining the resulting shifting of the weight of the filled receptacle due to such separation.

2. The method of testing milk which consists in separating the butter-fat and the milk while inclosed, and ascertaining the shifting of the weight of the inclosed liquid due to such separation.

3. A milk tester comprising a milk receptacle provided with end chambers adapted, respectively, for the reception of milk and butter-fat when separated, removable sealing means for said chambers, and a pivotally mounted balance for said receptacle for indicating the shifting of the center of gravity of said receptacle.

4. A milk tester comprising a base, an upright back board therefor provided with a graduated scale, a vertical standard disposed opposite said back board, a balance pan having laterally projecting stub shafts that are journaled to said back board and said standard, an adjustable weight suspended from said pan, a receptacle having enlarged end chambers, said receptacle adapted to be seated in said pan with its end chambers projecting beyond the ends of the pan, and a pointer carried by one of said stub shafts and coöperating with said scale to indicate the shifting of weights in said receptacle.

5. A milk tester comprising a receptacle having an enlarged chamber at each end, one of said chambers receiving the lighter and the other the heavier part of milk when separated, and means for ascertaining the shifting of the weight of the contents of one of said chambers.

6. A milk tester comprising a receptacle provided with enlarged end chambers adapted, respectively, for the reception of milk and butter-fat when separated, end caps for sealing said chambers, and means for indicating the shifting of the center of gravity of said receptacle comprising a pan in which said receptacle is seated, means for pivotally supporting the same, and an adjustable weight carried by said pan.

In testimony whereof I hereunto affix my signature in presence of two witnesses.

SILAS WITHERELL.

Witnesses:
JAMES L. KECK,
GEO. A. WILSON.

---

Copies of this patent may be obtained for five cents each, by addressing the "Commissioner of Patents, Washington, D. C."